May 31, 1966 T. A. WEIL 3,254,312

NOISE GENERATING CIRCUITS

Filed March 28, 1958

INVENTOR
THOMAS A WEIL
BY Elmer J. Gorn
ATTORNEY

United States Patent Office 3,254,312

Patented May 31, 1966

3,254,312

NOISE GENERATING CIRCUITS

Thomas A. Weil, Wellesley, Mass., assignor to Raytheon Company, a corporation of Delaware Filed Mar. 28, 1958, Ser. No. 725,472

7 Claims. (Cl. 331—78)

The present invention relates to noise generating circuits and more particularly to circuitry for increasing the uniformity and effectiveness of noise signals throughout a barrage spectrum when said signals are generated by frequency modulation using Gaussian noise as the modulating signal.

In noise generating circuits in which it is desirable to produce a wide barrage jamming spectrum, say 50 to 100 megacycles wide, a carrier is often frequency modulated according to the amplitude of a Gaussian noise signal, and it is usually desirable to obtain power uniformly spread over the desired bandwidth and to radiate as little power as possible beyond the desired bandwidth. As is known, uniform power density, and in fact, the effectiveness of a jamming signal over a given square or rectangular bandwidth, depends in part upon the sweep rate, SR, and in part upon the number of crossings per second, n.c./s., of the modulating voltage at the value which is required to swing the carrier signal to that particular frequency within the barrage band. Also, as is known, the jamming effectiveness of a barrage produced by frequency modulation with Gaussian noise deteriorates if the receiver being jammed is not tuned to the center of the barrage. This is because the power density of the barrage usually decreases away from the center. When attempts are made to distribute power evenly over the entire spectrum, these efforts usually result in non-uniform sweep rates or non-uniform crossings per second which again reduces the effectiveness of the jamming signal upon the receiver.

In numerous applications, therefore, it would be desirable to generate an artifical modulation or noise signal by circuits having a transfer characteristics in which the power distribution becomes uniform within a few percent in the desired bandwidth and in which the number of crossings per second and the sweep rate remains substantially uniform throughout the entire barrage band.

In accordance with the invention, a modulating signal which will provide uniform power distribution throughout the barrage band can be generated by clipping Gaussian noise at approximately 1.1 times its root means square value, and inverting or folding back all values above this value, thereby adding the values of noise so inverted to the main part of the noise signal. This is accomplished by feeding a source of Gaussian noise signals to a first full wave bridge rectifier and connecting in circuit with said rectifier a source of direct current bias in series with said Gaussian noise source, thereby selecting a first direct current level beyond which all noise values, such as positive peaks, are rectified, inverted, or folded back by the bridge rectifier upon the so-called unclipped portion of the noise signal. The output of the first full wave bridge rectifier is then fed to a second full wave bridge rectifier to which a second source of direct current bias has been connected in series opposition with the output of the first rectifier, thereby selecting a second direct current level below which all values or negative peaks of noise are again inverted or folded back by the rectifiying action of this second bridge rectifier and added to the unclipped noise voltage. A separate source of current is connected across the output of the first rectifier to insure that the first full wave bridge rectifier remains conductive even when the instantaneous values of noise output of the first rectifier are less than the output of the second bridge rectifier. In this manner, a compressed output noise signal is provided in which the amplitudes have a nearly equal probability distribution for all values from $-1.1$ to $+1.1$ times the original root mean square value of the Gaussian noise signal, thus providing an even power distribution over the barrage band. Furthermore, the slopes of the noise signal so produced are randomly distributed with the same root mean square value at any voltage, thus providing a uniform distribution of sweep rates over the entire barrage band, while the number of crossings per second remains uniform to insure effective jamming for any setting of the receiver within the band.

Further objects and advantages of this invention will be more apparent as the description progresses, reference being made to the accompanying drawings, wherein.

Figure 1:
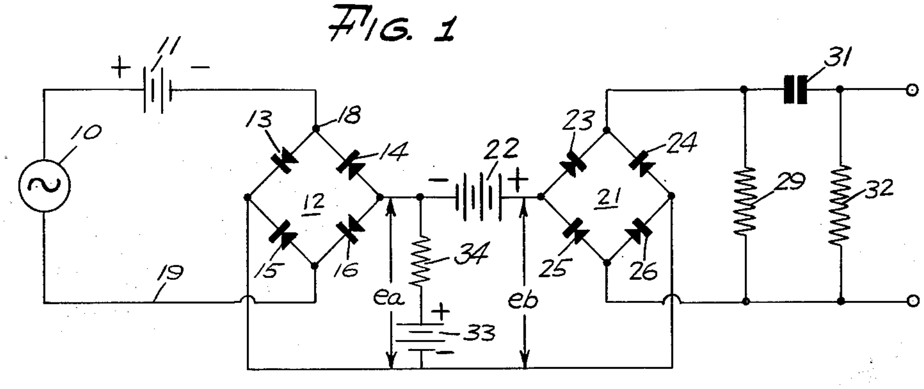
FIG. 1 is a schematic diagram of an embodiment of the noise folding or compressing circuit in accordance with the invention.
Figure 3:
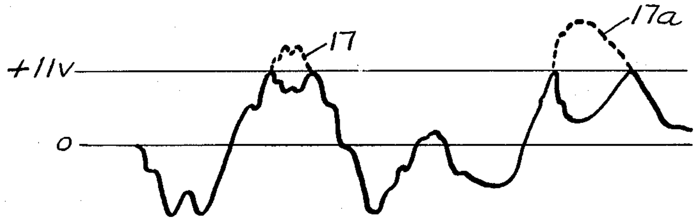
FIGS. 3 and 4 illustrate graphically the noise folding or compressing operation.

Referring now to FIG. 1, a noise source 10 of 10 r.m.s. volts, such as a typical noise tube generator, is shown connected in series with a direct current bias source 11 of approximately 11 volts or 1.1 times the root mean square value of the noise source. The bias source 11 is connected in series with a bridge rectifier 12 comprising oppositely poled rectifiers 13 and 14 in series with rectifiers 15 and 16. These rectifiers may be of a type similar to the 1N93 type. Since a full wave bridge rectifier has the characteristic that the output voltage will be of the same magnitude as the input voltage and of constant polarity, all positive noise peaks in excess of the 11 volt bias source, as shown at 17 and 17*a* in FIG. 3, will be inverted and folded back to provide a partially compressed noise signal. In operation, therefore, when the voltage at point 18 is positive, current can flow through the rectifier 13 to the load but not through rectifier 14. On the return circuit, current flows through rectifier 16 to the noise source by way of conductor 19. When the polarity of the alternating source reverses and the conductor 19 becomes positive with respect to point 18, current flows through rectifier 15 and the load, and through rectifier 14 to the opposite side of the noise source by way of bias battery 11. It should be understood that the bridge circuit can be replaced by a full wave center-tap rectifier circuit having a pair of rectifier tubes alternately conducting in connection with a transformer provided with a center tap connected to one side of the load. In this instance, a separate bias battery is connected in circuit with each terminal of the transformer and the associated rectifier.

Figure 4:
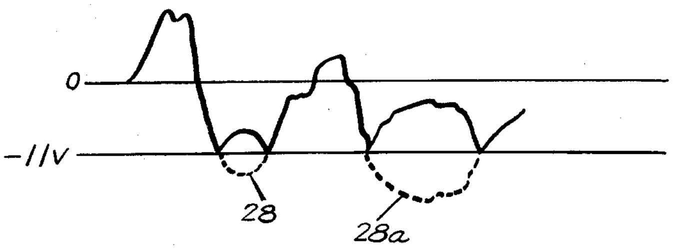

Referring again to FIG. 1, the partially compressed noise output $e_a$ is fed to a second full wave bridge rectifier 21 in series with a second direct current bias source 22 poled in opposite direction from bias source 11. In order to establish a direct current bias level of minus 1.1 times the r.m.s. noise voltage, and thus provide a compression circuit having the desired transfer characteristic shown in FIG. 2, it is apparent that the second bias source 22 must provide 22 volts of direct current in order to shift the bias level from $+1.1$ to $-1.1$ times the r.m.s. noise voltage. The full wave rectifiers 23 and 26 operate in a manner similar to rectifier 12 to invert or fold inwardly toward zero all values of noise 28 and 28*a*, shown in FIG. 4, in excess of the selected $-11$ volt direct current level. The folded noise output which has been compressed according to the transfer characteristic shown in FIG. 2, appears across a 100,000 ohm load resistor 29 and is connected to an output circuit by means of capacitor 31 and resistor 32 to remove the direct current component from the output.

To insure that the first bridge rectifier circuit 12 is conducting even when its output voltage $e_a$ is less in magnitude than the input voltage $e_b$ to the second bridge rectifier 21, a separate current source comprising a 50 volt direct current battery 33 is connected in series with a 100,000 ohm resistor 34 to draw sufficient current to maintain rectifiers 14 or 16 conducting during the entire operating cycle. For example, if $e_a$ and $e_b$ are of opposite polarity the first bridge rectifier 12 would tend to absorb instead of deliver current which would cut off rectifiers 14 and 16 unless the constant current source, as noted, is provided to draw sufficient load current to maintain both rectifiers conducting for all instantaneous values of noise voltage.

Figure 2:
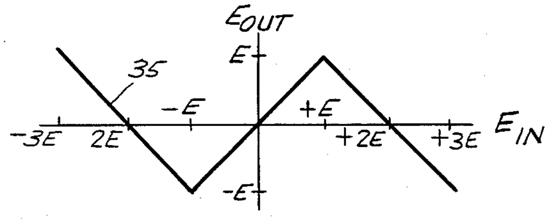
FIG. 2 is a graph illustrating the desired transfer characteristic of the noise folding or compressing circuit.

Referring now to FIG. 2, a graph is shown illustrating the desired output voltage for a given input voltage in which any values of noise between $-3^E$ and $+3^E$ are compressed to between $-1^E$ and $+1^E$, where E is preferably 1.1 times the r.m.s. value of the noise input voltage. In this manner the noise input voltage is compressed or folded according to the transfer characteristic which provides a nearly uniform distribution of amplitudes. For example, as seen by the waveform 35 of FIG. 2, a .5 volt input will provide a .5 volt output, a 1.5 volt input gives a .5 volt output, a 2 volt input gives zero output, a 2.5 volt input gives a —.5 volt output and a 3 volt input becomes a —1.0 volt output. Since the rate of change of output voltage for the rate of change of input voltage, i.e. slope, is either +1 or —1 the sweep rate is unchanged, although the direction of the voltage may be reversed. As noted, the selected transfer characteristic of the rectifier circuit provides a nearly uniform number of crossings per second and insures that the power distribution becomes uniform within a few percent within the desired bandwidth. It should be further understood that any other circuit providing the same transfer characteristic may also be used.

Furthermore, the slopes of the new noise signal are randomly distributed with the same root mean square value at any voltage and while the modulator circuits following the noise folder preferably must handle a slightly increased bandwidth due to the cusps and corners caused by the folding, the circuits ahead of the folder must simply be capable of handling noise voltages with approximately a 3-to-1 peak-to-r.m.s. ratio.

For the foregoing reasons it is to be understood that the above described arrangements are illustrative of the application of the principles of the invention. However, many modifications will be apparent to persons skilled in the art without departing from the spirit and scope of this invention. Accordingly it is desired that this invention not be limited by the particular details described herein, except as defined by the appended claims.

What is claimed is:

1. In combination, a source of Gaussian noise signals, a first full wave rectifier fed by said noise signals, a source of bias voltage connected in circuit with said rectifier and said noise source, thereby selecting all values of noise exceeding a predetermined direct current level, said rectifier adapted to invert said noise signals exceeding said first selected direct current level, a current source of predetermined value connected in parallel with the output of said first rectifier, a second full wave rectifier fed by the output of said first rectifier, a second bias source in circuit with said first and second rectifiers selecting noise values below a second predetermined direct current level of said noise signal entering said second rectifier, said latter rectifier adapted to invert said noise signals exceeding said second predetermined direct current level.

2. In combination, a source of Gaussian noise signals, a first bridge rectifier fed by said noise signals, a source of bias voltage connected in a series circuit with said bridge rectifier and said noise source, thereby selecting all values of noise exceeding a predetermined direct current level, said bridge rectifier adapted to invert said noise signals exceeding said first selected direct current level, a current source of predetermined value connected in parallel with the output of said first bridge rectifier, a second bridge rectifier fed by the output of said first bridge rectifier, a second source of bias voltage in circuit with said first and second bridge rectifiers selecting noise values in excess of a second predetermined direct current level of said resultant noise signals, said second bridge rectifier adapted to invert said noise signals in excess of a said second selected direct current level.

3. In combination, a source of Gaussian noise signals, a first bridge rectifier fed by said noise signals, a source of direct current bias connected in series opposition with said source of noise signals and said bridge rectifier, thereby selecting all values of noise exceeding a predetermined direct current level, said bridge rectifier adapted to invert said noise signals exceeding said first selected direct current level, a current source of predetermined value connected in parallel with the output of said first bridge rectifier, a second bridge rectifier fed by the output of said first bridge rectifier, a second source of direct current bias connected in series with the output of said first bridge rectifier and the input of said second bridge rectifier, thereby to select values of noise in excess of a second predetermined direct current level, said second bridge rectifier adapted to invert said noise signals in excess of a said second selected direct current level.

4. In combination, a source of Gaussian noise signals, a first bridge rectifier connected to said source of Gaussian noise signals, a first source of direct current bias of approximately 1.1 times the root mean square value of said Gaussian noise signals connected in series with said Gaussian noise source and in circuit with said first bridge rectifier, whereby said latter rectifier inverts all values of noise in excess of a selected direct current level, a current source of predetermined value connected in parallel with the output of said first bridge rectifier, a second bridge rectifier connected to the output of said first bridge rectifier, and a second source of direct current bias of approximately 2.2 times the root mean square value of said source of Gaussian noise connected in circuit with said first bridge rectifiers and poled in series opposition with the output of said first bridge rectifier, whereby said second bridge rectifier inverts all values of noise in excess of said second direct current level.

5. In combination, a source of Gaussian noise signals, a first bridge rectifier connected to said source of Gaussian noise signals, a first source of direct current bias of approximately 1.1 times the root mean square value of said Gaussian noise signals connected in series with said Gaussian noise source and in circuit with said first bridge rectifier, whereby said latter rectifier inverts all values of noise in excess of a selected direct current level, a second bridge rectifier connected to the output of said first bridge rectifier, a second source of direct current bias of approximately 2.2 times the root mean square value of said source of Gaussian noise connected in circuit with said first and second bridge rectifiers and poled in series opposition with the output of said first bridge rectifier, whereby said second bridge rectifier inverts all values of noise in excess of said second direct current level, and a current source of a predetermined value connected in parallel with the output of said first bridge rectifier to render said rectifier conducting for all values of noise voltage fed to said second bridge rectifier.

6. In combination, means for generating a signal having the characteristics of Gaussian noise, a transfer circuit fed by said signal and having a predetermined transfer characteristic, said transfer circuit including a direct current bias source connected in series to said Gaussian noise source and a first full wave bridge rectifier connected in circuit with said Gaussian noise source and said direct current bias source, a second direct current bias source connected in series with the output of said first full wave rectifier, and a second full wave bridge rectifier connected in circuit with said bias source and said first full wave bridge rectifier, whereby noise values in excess of direct current levels determined by said first and second bias sources are successively rectified and inverted, and a source of current connected across the output of said first full wave bridge rectifier to maintain conductivity in said first full wave bridge in all values of noise applied to said second full wave bridge.

7. In combination, means for generating a signal having the characteristics of Gaussian noise, a transfer circuit fed by said signal and having a predetermined transfer characteristic, said transfer circuit including a direct current bias source connected in series opposition to said Gaussian noise source and a first full wave bridge rectifier connected in circuit with said Gaussian noise source and said direct current bias source, a second direct current bias source connected in series with the output of said first full wave rectifier, a source of current connected in parallel with the output of said first full wave bridge rectifier, and a second full wave rectifier connected in circuit with said bias source and said first full wave bridge rectifier, whereby noise values in excess of direct current levels determined by said first and second bias sources are successively rectified and inverted.

References Cited by the Examiner

UNITED STATES PATENTS

| | | | |
|---|---|---|---|
| 2,453,958 | 11/1948 | Andresen | 250—27 |
| 2,480,201 | 8/1949 | Selove | 250—27 |
| 2,486,106 | 10/1949 | Brown | 250—36 |
| 2,597,870 | 5/1952 | Jensen et al. | 328—169 |
| 2,639,386 | 5/1953 | Karpeles | 331—78 |
| 2,686,301 | 8/1954 | Bailey | 250—27 |
| 2,773,185 | 12/1956 | Fulton | 250—36 |
| 2,802,167 | 8/1957 | Cooper | 250—27 |

ROY LAKE, *Primary Examiner.*

CHESTER L. JUSTUS, FREDERICK M. STRADER, *Examiners.*

L. RAWICZ, T. D. JENNINGS, K. CLAFFY, *Assistant Examiners.*